C. SJOMAN.
COMBINED HARROW AND PULVERIZER.
APPLICATION FILED MAY 13, 1911.
1,028,398.
Patented June 4, 1912.
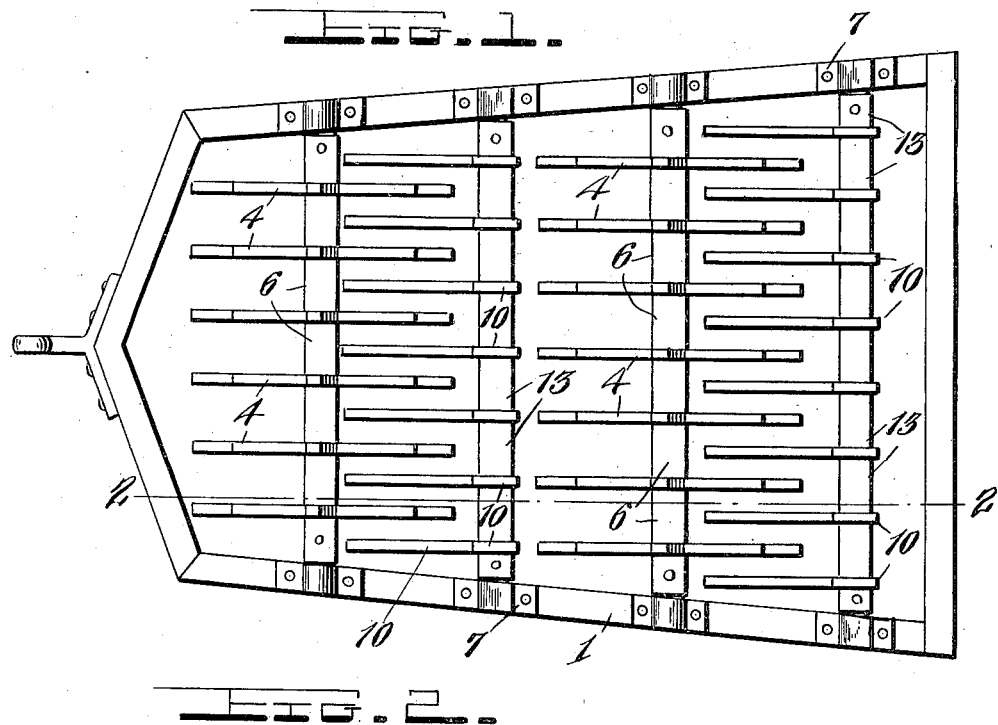
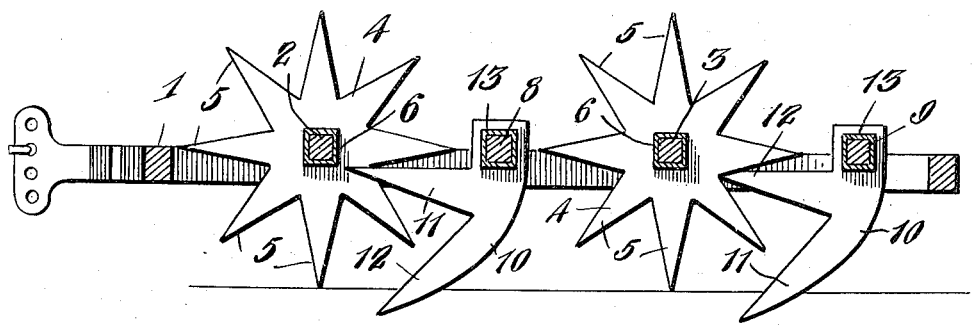
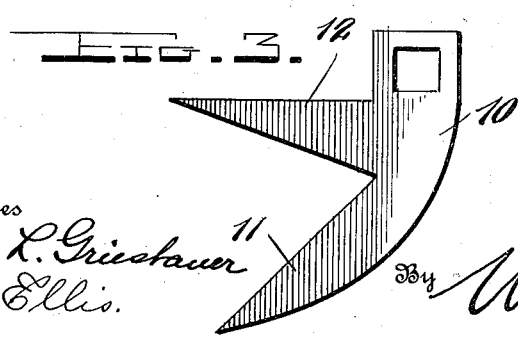
Inventor
Carl Sjoman,
By Watson E. Coleman.
Attorney
Witnesses
Chas. L. Grieshauer
L. G. Ellis.

UNITED STATES PATENT OFFICE.

CARL SJOMAN, OF RAMSAY, MICHIGAN.

COMBINED HARROW AND PULVERIZER.

1,028,398.

Specification of Letters Patent.

Patented June 4, 1912.

Application filed May 13, 1911. Serial No. 626,893.

*To all whom it may concern:*

Be it known that I, CARL SJOMAN, a citizen of the United States, residing at Ramsay, in the county of Gogebic and State of Michigan, have invented certain new and useful Improvements in Combined Harrows and Pulverizers, of which the following is a specification, reference being had to the accompanying drawings.

My invention relates to new and useful improvements in harrows and diggers and more particularly to a combined harrow and pulverizer, and my object is to provide a device of this character in which there is provided rigidly held and rotating ground treating implements.

A further object of the invention resides in providing means to prevent the clogging of the rotating members and the carrying of trash and the like in the operation thereof, and a still further object resides in providing combination teeth which are adapted to engage the soil and also remove the clods and trash which are adapted to adhere to the rotating members.

A still further object is to provide a simple and economical device which will effectively carry out the purpose for which it is designed.

With these and other objects in view, my invention consists in the novel features of construction, combination and arrangement of parts as will be hereinafter referred to and more particularly pointed out in the specification and claim.

In the accompanying drawing forming a part of this application, Figure 1 is a top plan view thereof. Fig. 2 is a vertical longitudinal section as seen on line 2—2, Fig. 1, and Fig. 3 is a side elevation of one of the combination teeth.

In carrying out my invention, I shall refer to the drawing in which similar reference characters designate corresponding parts throughout the several views and in which—

1 indicates a frame of the usual or any preferred type used in such devices as harrows, in the forward end of which there is rotatably mounted a shaft 2, and some distance to the rear of the same, is rotatably mounted an additional shaft 3. These shafts are for the greater portion thereof square in cross section, but reduced and formed circular in cross section at the ends thereof so as to be rotatably mounted in bearings, and mounted on each of said shafts 2 and 3, is a plurality of cutters or the like 4, said cutters being substantially star-shaped and the points 5 thereof forming substantial teeth. These star-shape cutters 4 are provided with square openings to receive the squared portion of the shafts and are held in spaced relation with one another by means of the spacing sleeves 6, and thus it will be seen that as the frame 1 is drawn forwardly, the teeth 5 of said cutters are adapted to engage the soil and rotate the shafts.

Securely and rigidly mounted in the bearings 7 on the frame 1, are the additional shafts 8 and 9, said shafts being disposed, respectively, to the rear of the shafts 2 and 3 and carried on said shafts 8 and 9, is a plurality of teeth 10, the purpose of which will be hereinafter described. These teeth are combination teeth, being provided with downwardly and forwardly projecting portions which extend to a point below the teeth 5 of the cutters 4 and are also provided with the forwardly or substantially horizontally disposed portions 12 which extend to points adjacent the shafts 2 and 3 upon which the cutters 4 are mounted. These teeth are rigidly mounted on the shafts 8 and 9 and are held in spaced relation with one another by means of the spacing sleeves 13 similar to the sleeve 6, said teeth being disposed in staggered relation with the cutters 4, so that the horizontally projecting portions 12 thereof extend on opposite sides or between said cutters 4. In this manner, it will be seen that as the frame 1 is drawn forwardly, the portions 11 of the teeth 10 will dig the soil, the same performing the same functions as drag hook teeth, and the teeth 5 of the cutters 4, being above the effective ends of the portions 11, will engage the larger clods of earth to aid in digging and pulverizing the same. It is a well known fact that in any rotating teeth, earth clods, trash and the like are adapted to adhere thereto, and in order to prevent the same from interfering with the operation of these rotating members, the portions 12 of the combination teeth 10 are disposed adjacent the teeth of said cutters so as to clean the same of such trash.

Although I have not shown the same, it will be understood that any desired means may be provided whereby a swingle or double-tree may be attached to the frame 1, so that draft may be applied.

From the foregoing, it will be seen that I have provided a combined harrow and pulverizer in which there is used both stationary and rotating cutters or teeth, and it will further be seen that the stationary teeth are additionally provided with means for the cleaning of the rotating teeth of the trash and the like, which are adapted to adhere thereto. Furthermore, it will be seen that by providing combination teeth, such as above described, simplicity of construction is gained as well as labor and expense saved. It will still further be seen that the device is of such simple construction as to be readily and cheaply manufactured, and one which is extremely effective in operation.

It will be understood that various changes in form, proportion and in the minor details of construction may be resorted to without sacrificing any of the principles of the invention.

What I claim is:—

In a device of the class described, the combination with a frame, a pair of rotatably mounted shafts thereon, and star-shaped cutters carried on said shafts; of an additional pair of shafts arranged in the rear of said mentioned shafts and rigidly mounted on the frame, a plurality of double pointed ground-treating teeth arranged on said last mentioned shafts, one of the points of said teeth being disposed below the cutters and the other between said cutters adapted to remove the trash therefrom.

In testimony whereof I hereunto affix my signature in the presence of two witnesses.

CARL SJOMAN.

Witnesses:
 IRVING W. TWETTNER,
 LEVI S. RICE.

Copies of this patent may be obtained for five cents each, by addressing the "Commissioner of Patents, Washington, D. C."